United States Patent
Katsumura et al.

(10) Patent No.: US 6,394,344 B1
(45) Date of Patent: May 28, 2002

(54) CARD READER

(75) Inventors: Masanobu Katsumura, Kumamoto; Takanori Muranaka, Tamana; Kazutaka Sakamoto, Kikuchi-gua; Shigeki Maeda, Tamana; Makoto Yonemura; Hidekazu Hata, both of Kumamoto, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/178,700

(22) Filed: Oct. 26, 1998

(30) Foreign Application Priority Data

Oct. 29, 1997 (JP) ................................................ 9-296739

(51) Int. Cl.⁷ .............................. G06K 5/00; G06K 7/00
(52) U.S. Cl. .................... 235/380; 235/435; 235/439
(58) Field of Search ............................. 235/380, 382, 235/435, 439, 441, 449; 705/1, 17, 35, 39, 44

(56) References Cited

U.S. PATENT DOCUMENTS

| | | | | |
|---|---|---|---|---|
| 4,746,304 A | * | 5/1988 | Asai | 439/248 |
| 5,541,985 A | * | 7/1996 | Ishii et al. | 379/111 |
| 5,652,422 A | | 7/1997 | Shimaoka et al. | 235/475 |
| 5,657,389 A | * | 8/1997 | Houvener | 380/23 |
| 5,798,507 A | * | 8/1998 | Kawagishi | 235/380 |
| 5,896,159 A | * | 4/1999 | Masubuchi et al. | 347/194 |
| 5,902,055 A | * | 5/1999 | Oshino et al. | 400/120.16 |
| 5,932,869 A | * | 8/1999 | Gottlich et al. | 235/493 |
| 6,000,607 A | * | 12/1999 | Ohki et al. | 235/379 |
| 6,011,570 A | | 1/2000 | Muranaka et al. | 347/171 |
| 6,064,413 A | * | 5/2000 | Fukui et al. | 347/171 |
| 6,065,679 A | * | 5/2000 | Levie et al. | 235/462.47 |

FOREIGN PATENT DOCUMENTS

| | | |
|---|---|---|
| JP | 4-104757 | 9/1992 |
| JP | 410187867 A | * 7/1998 |

* cited by examiner

Primary Examiner—Michael G. Lee
Assistant Examiner—Jamara A Franklin
(74) Attorney, Agent, or Firm—Wenderoth, Lind & Ponack, L.L.P.

(57) ABSTRACT

A card reader has a main body and a card reader unit provided within the main body for executing at least one of recording and reproducing data on a card inserted in the card reader unit. A first communication unit is provided within the main body for executing at least one of inputting and outputting a signal, a power supply unit is provided within the main body for supplying electric power to each unit, and a controller is provided within the main body for controlling each unit. An accessory device can be removably attached to the main body for having at least one of the functions among a printing function, a data communicating function and a display function. A second communication unit is provided within the accessory device for having at least one of the functions of receiving a signal from the first communication unit and sending a signal to the first communication unit.

23 Claims, 10 Drawing Sheets

CARD READER

FIELD OF THE INVENTION

The present invention relates to card readers for at least reading data from media in the form of a card such as a magnetic card, a rewritable printing card, an IC card and others.

BACKGROUND OF THE INVENTION

Figure 14:
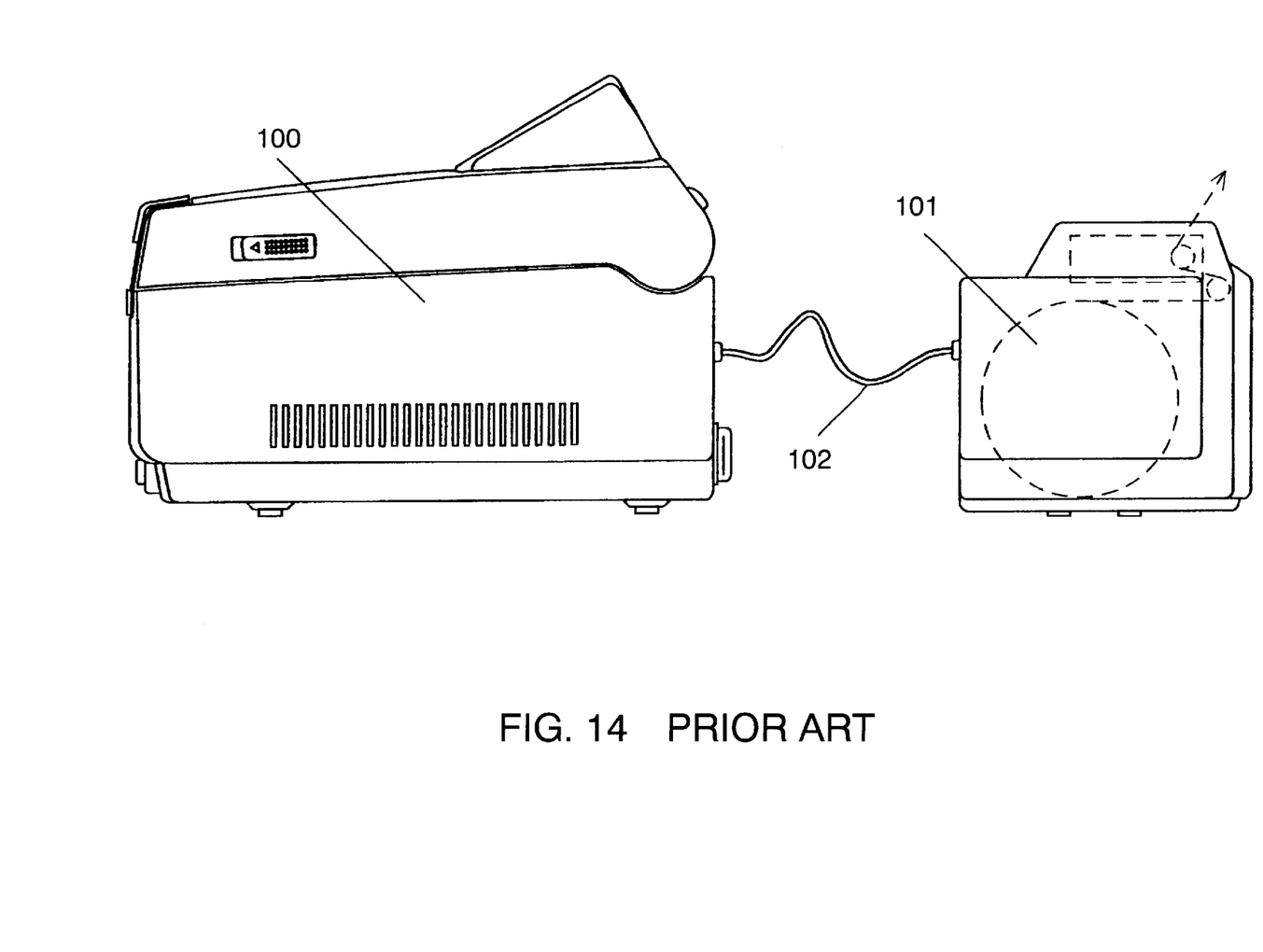
FIG. 14 is a side view of a card reader of the prior art.

FIG. 14 is a side view showing a card reader of the prior art. A main body 100 of the card reader reads and writes data of a card inserted into it. A printer 101 prints certain characters on thermal paper or like material according to the data read by the main body 100 of the card reader, and outputs the paper. A cable 102 electrically connects the printer 101 with the main body 100 of the card reader, and communicates the data between the card reader and the printer 101.

Also, there has been suggested another structure in which a printer is provided integrally with a main body of the card reader as described in the Japanese Utility Model Laid-Open Publication No. H04-104757.

However, since the structure as stated above uses the cable 102, etc. for connecting between the main body 100 of the card reader and the printer 101 consideration of the wiring is required during installation, which interferes with the working efficiency. A problem of complicated wiring is also raised, as it requires two separate electrical supplies for the main body 100 of the card reader and the printer 101.

Also, in the structure, wherein the printer is integral with the main body of card reader, the printer makes the main body heavy and the whole apparatus bulky when the printer is not used, as there are uses where printers are not at all necessary, thereby resulting in the apparatus as being rather difficult to handle.

SUMMARY OF THE INVENTION

It is an object of the present invention to provide card readers which can simplify wiring, etc., and to provide card readerscapable of being reduced in size.

A card reader of the present invention comprises a main body, a card reader unit provided within the main body for executing at least one of recording and reproducing data on a card inserted into it, and a first communication unit provided within the main body for executing at least one of inputting and outputting a signal with the outside. A power supply unit is provided within the main body for supplying electric power to each unit, and a controller is provided within the main body for controlling each unit. An accessory device is removably attached to the main body and has at least one of the functions among a printing function, a data communicating function and a display function, and a second communication unit is provided within the accessory device and has at least one of the functions of receiving a signal from the first communication unit and sending a signal to the first communication unit. Hence, a reduction of size of the apparatus as well as a reduction of an installation space are realized, and usability is improved since the card reader is adaptable to functions necessary for any type of business.

Also, by using a printing apparatus as an accessory device of the card reader of the present invention for printing prescribed data on a medium in response to the signal from the first communication unit, a ticket can be issued according to a score recorded in the card, for instance, in addition to printing a condition of the card transacted by the card reader.

Moreover, by using a thermal head as the printing apparatus for printing the characters on a medium with thermal sensitivity, the card reader becomes advantageous in terms of cost, and facilitates maintenance because it is easy to handle.

Furthermore, with the use of connectors to compose the first and second communication units in the main body and the accessory device of the card reader, wiring etc. for the signal communication are eliminated, the installation space is reduced, and the appearance of the installation is improved.

Still furthermore, the present invention supplies electric power from the main body to the accessory device through the first and the second communication units, so that separate wiring for the electric power supply is eliminated, the installation space is reduced, and the appearance of the installation is improved.

The main body of the card reader of the present invention comprises a pair of upper and lower units pivotally engaged by a hinge, and the card reader unit is also separated into two parts so that opening the pair of units also opens the card reader unit. This enables a jammed card to be cleared easily, as the card travelling path is made readily accessible if a card jam ever occurs in the card reader unit, thus improving the ease of maintenance.

The main body of the card reader of the present invention further comprises an input unit for inputting data and a display unit for displaying prescribed characters. The desired data can be recorded in the card, an initial setting of the card reader is easily made, and an operating condition of the card reader is readily observed.

DETAILED DESCRIPTION OF THE PREFERRED EMBODIMENTS

A preferred embodiment of the present invention is described hereinafter by referring to the drawings.

Figure 1:
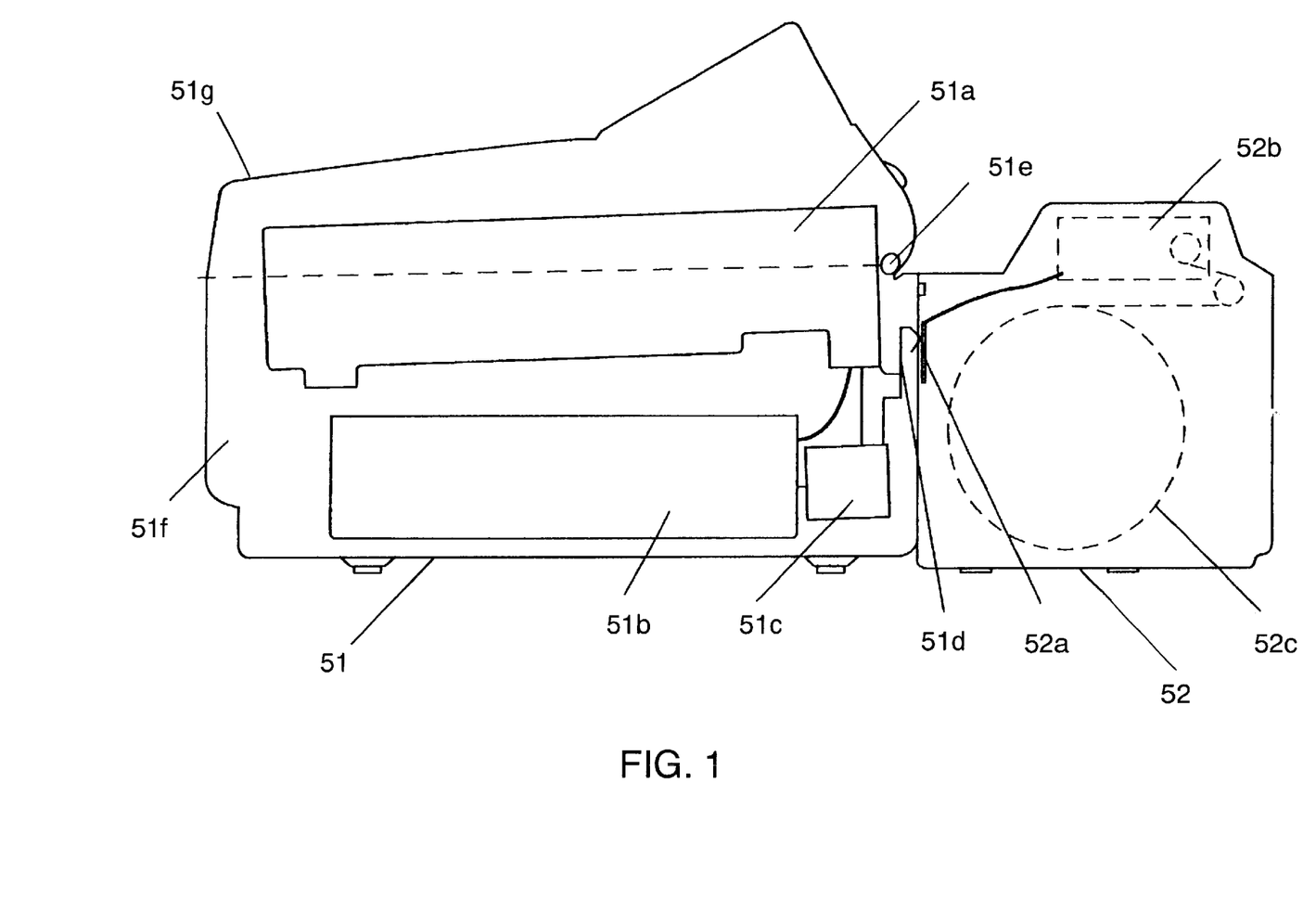
FIG. 1 is a schematic side view showing a card reader of a preferred embodiment of the present invention.

Referring to FIG. 1, it is preferable to compose a main body 51 of a material, such as polymeric resin or the like, that is light in weight and easy to process. Housed within the main body 51 are at least a card reader unit 51a, a power supply unit 51b, a controller 51c for controlling individual units, and a first communication unit 51d. The first communication unit 51d executes at least one of sending signals to and receiving signals from an accessory device, which matter is explained later. The card reader unit 51a, the power supply unit 51b, the controller 51c and the first communication unit 51d may be positioned anywhere, regardless of the structure shown in the preferred embodiment. Furthermore, the first communication unit 51d can be so constructed that it delivers electrical power to be supplied to the accessory device, besides sending signals to the accessory device, thereby making wiring unnecessary and simplifying the structure.

Also, the main body 51 comprises a pair of upper and lower units 51f and 51g conterminously separated along a dashed line as shown in FIG. 1. The lower unit 51f and the upper unit 51g are openable by being engaged by a hinge 51e. An upper part of the card reader unit 51a is disposed on the upper unit 51g, and a lower part of the card reader unit 51a is disposed on the lower unit 51f. Therefore, when the main body 51 is opened and closed, the card reader unit 51a also opens and closes at the same time, so that a jammed card is easily removed if it occurs inside the card reader unit 51a.

An accessory device 52 is removably attached to the main body 51. A printing apparatus, a display device, a communication device utilizing lights, electromagnetic waves, etc. and a modem device are some examples of devices that can be used as the accessory device 52. The embodiment is described below using a printing apparatus as an example of the accessory device 52.

The accessory device 52 is internally provided with a second communication unit 52a for receiving signals transmitted by the first communication unit 51d of the main body 51, a printing apparatus 52b provided with a printing means such as a thermal head, and a medium 52c for being printed on. The printing apparatus 52b also includes transfer means for transferring the medium 52c. The second communication unit 52a may combine control circuitry as well. Although the second communication unit 52a needs to be capable of at least receiving signals from the main body 51, it may include a function for transmitting an error signal to the controller 51c via the first communication unit 51d in order to provide the controller 51c in the main body 51 with an error signal when an error takes place within the accessory device 52.

As for operation of the accessory device 52, the card reader unit 51a transfers a first signal generated according to reproduced data read from a card inserted into it to the first communication unit 51d either directly or through the controller 51c. The first communication unit 51d, in turn, delivers the first signal to the second communication unit 52a of the accessory device 52. The second communication unit 52a selects characters to be printed according to the first signal, and transmits a second signal corresponding to the characters, etc. to the printing apparatus 52b. The printing apparatus 52b drives a thermal head according to the second signal, prints the selected characters, etc. on a medium 52c (thermal paper), and releases it to the outside of the accessory device 52 by driving the transfer means at the same time.

As for the other operation, the controller 51c transfers data (data such as customer information, the number of cards run through the card reader unit 51a, a cumulative score of points recorded in the cards, etc.) stored in a memory provided within it to the accessory device 52 via the first communication unit 51d, and the accessory device 52 prints out characters, etc. with the printing apparatus 52b according to the data.

Although the present embodiment confers a benefit in terms of maintenance and cost by adoption of a thermal printer for the printing apparatus of the accessory device, an ink-jet printer or a laser beam printer may be used if printing on plain paper is desired by simple alteration of a head, etc. of the printing apparatus 52b in that case.

A means for removably attaching the accessory device 52 to the main body 51 may include a screw or similar fastener, may include a latching means fixed to at least either one of the accessory device 52 and the main body 51, may include holding them using a resilient member, or may include a combination of any of the above methods.

With the accessory device 52 removably attached as has been described, the versatility of the card reader is increased and the function most needed for a business can be provided, since a desirable accessory device 52 of any kind can be adapted according to the place of installation, the specifications, etc. of the card reader. If a utility ticket is to be issued according to data recorded in the card, as an example, a printing apparatus is used as the accessory device 52, or in case of transmitting monthly or other data to a host computer, etc. the accessory device 52 can be replaced by a modem device, thus making it remarkably useful. Moreover, the installation space can be reduced by not mounting the accessory device 52 to the main body 51 when using it only as a card reader. Usability is thus improved remarkably as compared with the prior art structure in which every function is housed within one enclosure.

Furthermore, formation of the place of installation can be simplified and the appearance is improved since the amount of wiring is reduced by supplying electric power to the accessory device 52 from the main body via the first communication unit 51d and the second communication unit 52a.

Whereas the structure of the prior art costs much more, because it requires replacement of the card reader unit, etc. that is not even at fault when only the accessory device 52 fails, the construction of the present embodiment offers an advantage in terms of both cost and serviceability since it needs to replace only the accessory device 52 when it fails, due to the structure of the accessory device 52 in being removably attached to the main body 51.

Figure 2:
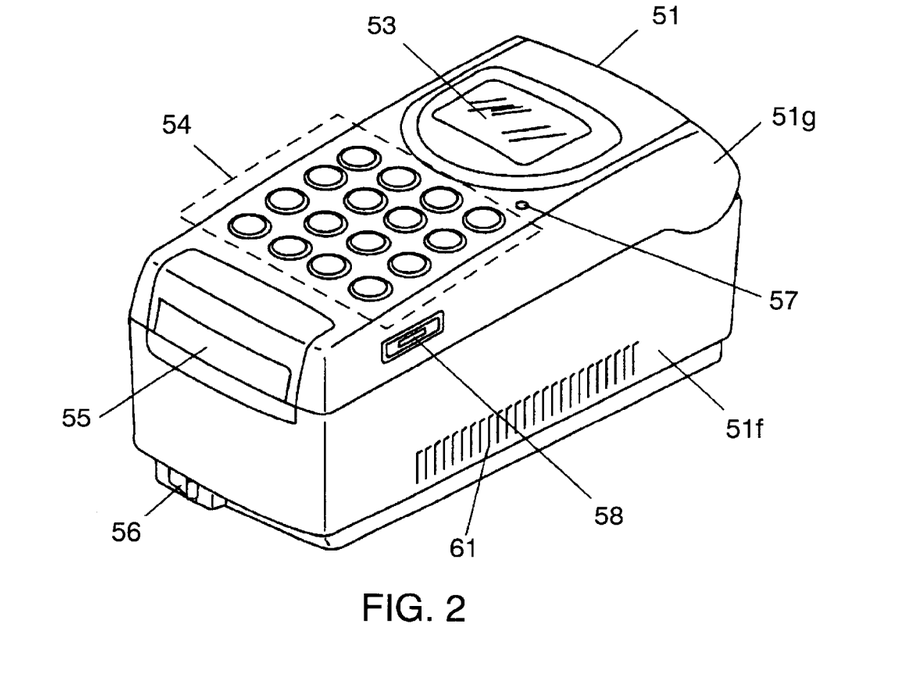
FIG. 2 is a perspective view showing a main body of the card reader of a preferred embodiment of the invention.
Figure 3:
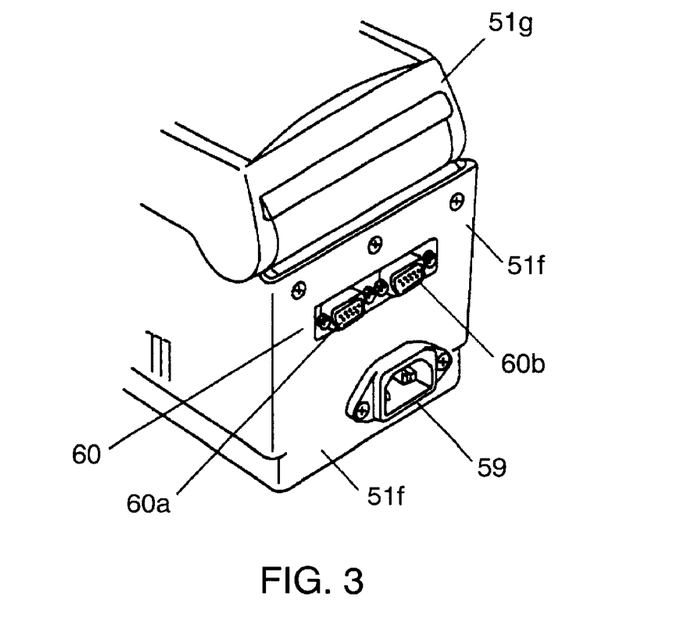
FIG. 3 is a perspective view showing a rear part of the main body of the card reader of the same embodiment.

The main body 51 is hereinafter described in detail by referring to FIG. 2 and FIG. 3.

A display unit 53 is provided with the upper unit 51g. The display unit 53 may employ a liquid crystal display, an electro-luminescent display, an organic electro-luminescent display, a cathode-ray tube, etc. It is preferable to use the liquid crystal display, however, taking into account the cost, thickness, etc. This display unit 53 can display at least one of an initial setting menu of the main body 51, the type of a card being inserted and the card holder's name, the time of day, an indication of error, etc. By providing a clock within the main body 51, the time of day can be displayed on the display unit 53, as previously noted.

An input unit 54 is used for inputting specific data, for which a keyboard, a touch panel, a hand writing input device, etc. may be used. In this embodiment, the keyboard is used in consideration of the cost and ease of manipulation. The input unit 54 is able to accept input of at least one of, for example, a membership number, the kind of merchandise and its price, a personal identification number, the type of the card, etc., in addition to accepting an input of data for the initial setting.

A card insertion port 55 is used for inserting a card into the main body 51 and for discharging the card drawn in the main body 51, and joins with the card reader 51a as shown in FIG. 1. In this instance, a card provided with at least one of a magnetic stripe, a printing display area and an integrated circuit is to be used for the card reader of the present embodiment.

A power switch 56 is used for turning on the power supply to at least the main body 51, but it can be so arranged as to turn on the power supply of the accessory device 52. A lighting element 57 is used for enabling the user to determine whether the power supply is turned on, and it is preferable to use a light emitting diode or the like. Alternatively, an indication of whether the power supply is turned on can be made in the display unit 53, and the lighting element 57 is omitted in this case.

A latch unit 58 is used for interlocking the lower unit 51f and the upper unit 51g with each other. Setting the latch unit 58 prevents opening of the upper unit 51g from the lower unit 51f, and releasing the latch unit 58 makes the upper unit 51g openable.

A power supply part 59 is provided within the lower unit 51f, and an electrical plug is inserted in order to supply electric power to the main body 51. The power supply part 59 constitutes a part for providing electric power supply to the power supply unit 51b that supplies electric power to the individual units within the main body 51 and the accessory device 52.

A first connector 60 is used for executing at least one of transmitting and receiving signals with the accessory device 52, and it constitutes at least a part of the first communication unit 51d. The accessory device 52 is equipped with a separate second connector 70 (see FIG. 13) which corresponds to the first connector 60. In the structure depicted in FIG. 1, the first communication unit 51d comprises a metal electrode with a protrusion, and the second communication unit 52a of the accessory device 52 comprises an electrode for contacting the protrusion. While this method eases the connection with the accessory device 52, it poses a possibility of faulty contact, and presents a slight uncertainty in reliability. On the contrary, with the structure of the first communication unit 51d using the first connector 60, the electrical contact between the main body 51 and the accessory device 52 is reliably made, and the firmness of the connection between the main body 51 and the accessory device 52 is increased. Although the present embodiment employs two first connectors 60a and 60b, there can be one, or three, or more. By providing a plurality of first connectors 60 and disposing each of those first connectors 60 at different locations, various kinds of the accessory devices 52 can be installed with the main body 51 without error, as the connectors 60 corresponding are adaptable exclusively to each of the various accessory devices 52. As shown in FIG. 3 for example, a printing apparatus as an accessory device 52 is connected to the first connector 60b, and a modem apparatus as another accessory device 52 is connected to the first connector 60a.

A plurality of slit openings 61 are provided on a side of the main body 51. Since the power supply unit 51b is located at a lower part of the main body 51 and the power supply unit 5ib generates considerable heat, it is possible for some of the parts within the main body 51 to get damaged by the heat. By providing the plurality of slit openings 61 in this way on the lower side of the main body 51, the heat generated by the power supply unit 51b is dissipated through the slit openings 61 to thereby reduce the heat damage to the parts.

The card reader unit 51a is now described in detail by referring to FIG. 4 through FIG. 12.

Figure 4:
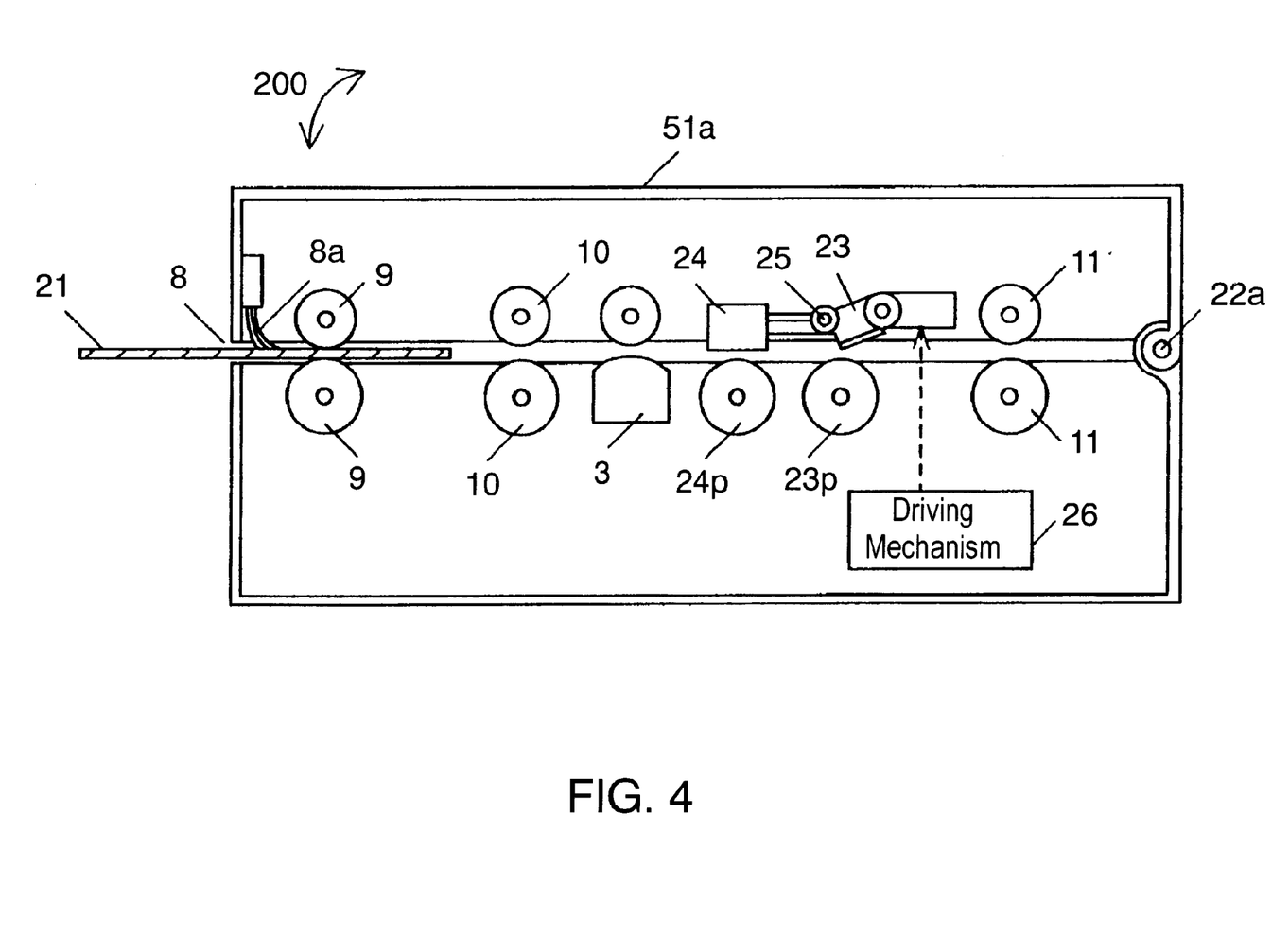
FIG. 4 is a brief structural drawing of a card reader unit of a preferred embodiment of the invention.

The card reader unit 51a comprises a recording head 3 for performing at least one of recording and reproducing information by means of magnetism or the like on a recording layer of a rewritable recording medium (i.e., a card) 21, a printing head 23 for printing information on a rewritable coloring layer of the rewritable recording medium 21, and an erasing head 24 for erasing the information printed on the rewritable coloring layer. The printing head 23 and the erasing head 24 are linked by a pin 25, and both of the heads adjoin and disjoin with the rewritable recording medium 21 for interlocking movement by a driving mechanism 26, which is described below in detail. The rewritable recording medium 21 utilized for the card reader unit 51a has the aforementioned rewritable coloring layer on one of its surfaces and the recording layer on the other surface to be capable of recording, reproducing and erasing information using the recording head 3. Characters are printed in white color so as to be visible by heating a printing area 21a furnished on the rewritable coloring layer with the printing head 23.

The rewritable recording medium 21 is inserted into an insertion port 8 of the card reader unit 51a with the printing area 21a facing upward. A discharging brush 8a, as an example of a discharging means, is positioned in the vicinity of the insertion port 8 in order to discharge static electricity that the rewritable recording medium 21 is charged with. The discharging brush 8a is not necessarily positioned in the vicinity of the insertion port 8, but it can be located at any appropriate spot along a transfer path of the rewritable recording medium 21. By providing the discharging brush 8a in the vicinity of the insertion port 8, adverse effects of static electricity on the recording layer on the reverse side of the rewritable recording medium 21 are effectively prevented, as the static electricity of the rewritable recording medium 21 is wiped out with the discharge function. All of the process for the rewritable recording medium 21 inserted into the insertion port 8 is completed while the recording medium 21 makes two reciprocal roundtrips in the card reader unit 51a through guiding rollers 9 through 11, driven by a driving means which is not shown in the figures. Incidentally, the insertion port 8 communicates with the card insertion port 55.

While the rewritable recording medium 21 is transferred by the guiding rollers 9 through 11 at a high speed (e.g. 400 mm/sec) in its first roundtrip, it is subjected to at least one of recording and reproducing of information in the recording layer on the reverse side with the recording head 3, and is sent back again at the high speed to return it to the initial state where it is held by the guiding rollers 9 and 10.

Figure 6:
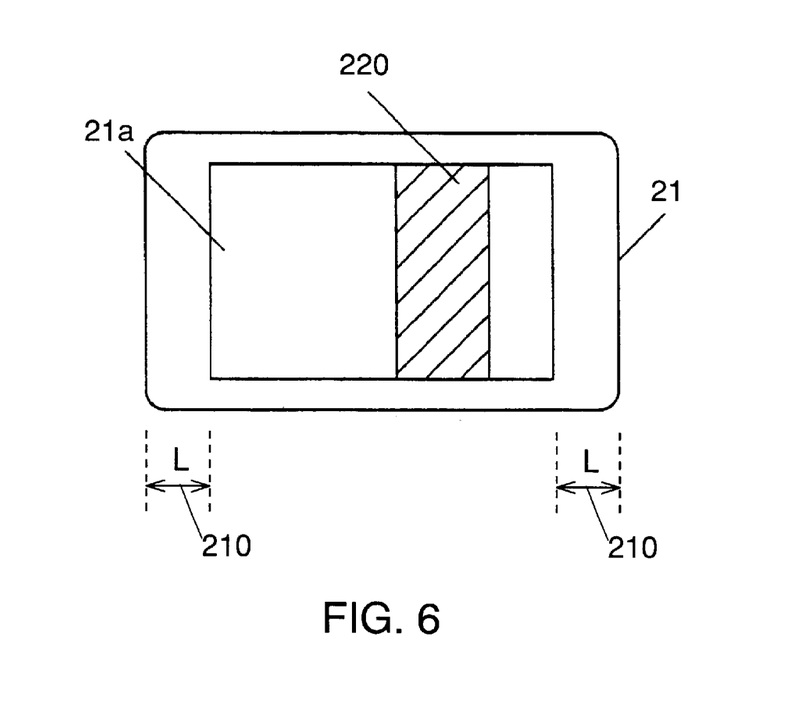
FIG. 6 is a top view of a card for use with the card reader unit of the same embodiment of the invention.
Figure 7:
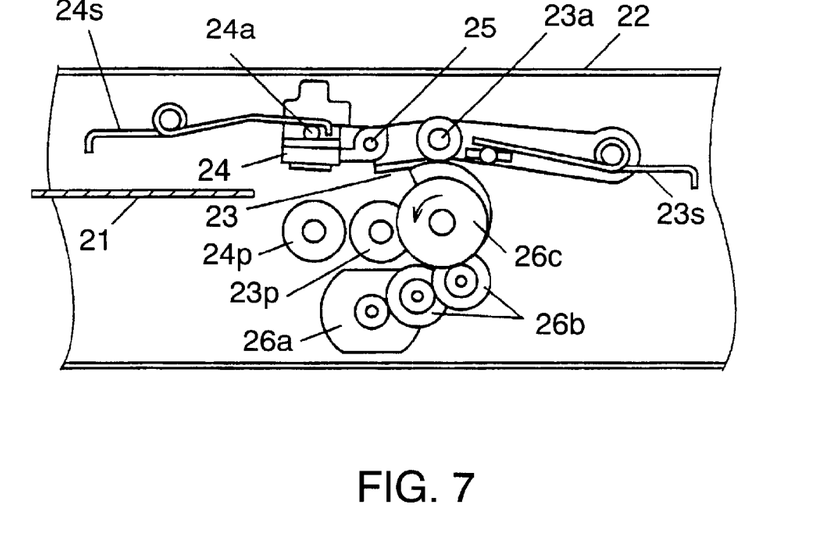
FIG. 7 is a schematic structural drawing showing a movement of an erasing head and a printing head of the card reader unit of a preferred embodiment of the invention.
Figure 8:
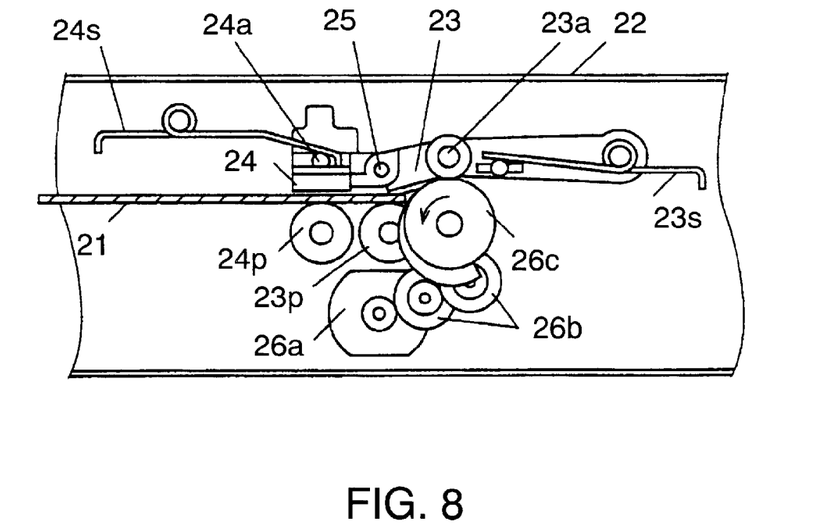
FIG. 8 is another structural drawing, in brief, showing movement of the erasing head and the printing head of the card reader unit of the same embodiment.

During a second roundtrip, the rewritable recording medium 21 is transferred at the high speed to a predetermined position above platen rollers 24p and 23p in order to have the printed information, which has been formed on the rewritable coloring layer in the printing area 21a, erased and then reprinted. Upon arrival of the rewritable recording medium 21 at the predetermined position for being erased and reprinted, the transfer speed of the rewritable recording medium 21 is switched to a low speed (e.g. 30 mm/sec). Then, an up-down cam 26c is rotated by a motor 26a of a driving mechanism 26 via a reduction gear 26b, as shown in FIG. 7 and FIG. 8. This lowers the erasing head 24 and the printing head 23 by means of a spring 24s, which forces the erasing head 24 down, and a spring 23s, which forces the printing head 23 down. The erasing head 24 is heated to an erasable temperature (e.g. near 80 degrees C.) and erases only a selected part 220 within the printing area 21a of the rewritable recording medium 21 at first. The printing head 23 is then heated up to a printing temperature (e.g. near 100 degrees C.) and prints any characters, figures, etc. within a selected part 220 of the printing area 21a, as the rewritable recording medium 21 is being transferred as shown in FIG. 6. Upon completion of the above process, the guiding rollers 9 through 11 rotate in a reverse direction to transfer the recording medium 21 at the high speed and to eject the rewritable recording medium 21 through the insertion port 8, while at the same time verification is made for the recorded information when the rewritable recording medium 21 passes over the recording head 3.

As has been described, the card reader unit 51a is composed so as to raise and lower both of the erasing head 24 and the printing head 23 by only the driving mechanism 26, thus permitting the driving mechanism 26 that causes the two heads to adjoin and disjoin with the rewritable recording medium 21 to be simplified. Since the erasing head 24 and the printing head 23 are mounted so as to be individually movable with axles 24a and 23a, respectively, both of the heads can tilt independently so that a condition of ideal contact against the rewritable recording medium 21 is attainable. In this regard, ideal contact, is a close contact of the both heads entirely with the rewritable recording medium 21. When this ideal contact is attained, the printing area 21a of the rewritable recording medium 21 is sufficiently heated by the two heads so as to avoid any failure such as incomplete erasing and blurred printing.

Figure 5:
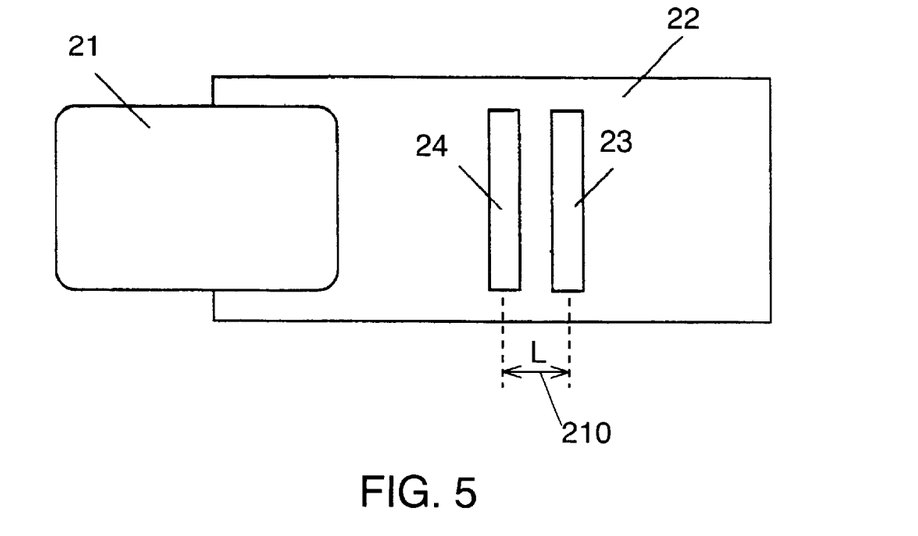
FIG. 5 is a schematic plan view depicting an outline of a card reader unit of a preferred embodiment of the invention.

Since the card reader unit 51a is composed so as to raise and lower the erasing head 24 and the printing head 23 simultaneously, as shown in FIG. 7 and FIG. 8, it can not print on the rewritable recording medium 21 at forward and rearward sections as shown in FIG. 6 for the extent of a span 210 (L) from a center of the erasing head 24 to a center of the printing head 23 as depicted in FIG. 5. Therefore, in order to expand the printing area 21a, the span 210 (L) is shortened by placing the erasing head 24 and the printing head 23 as close to each other as possible so as to enlarge the printing area 21a with respect to a longitudinal direction of the rewritable recording medium 21. During the previously noted second roundtrip, the rewritable recording medium 21 receives the weight of the erasing head 24 and the weight of the printing head 23 at the forward and rearward sections while being printed. If the diameter of the platen roller 24p at the erasing head 24 side is larger than the diameter of the platen roller 23p at the printing head 23 side due to a dispersion of diameters of the platen rollers 24p and 23p or for other reasons, the rewritable recording medium 21 is not transferred properly, because a difference in the transfer speed occurs between each of the platen rollers 24p and 23p. Consequently, the rewritable recording medium 21 moves as if being thrust away from behind, and this causes skipped printing in the shape of a line since the printing head 23 is not able to sufficiently heat the printing area 21a.

In order to avoid the skipped printing described above, the platen roller 23p at the printing head 23 side is appointed as a base of the transfer speed at all times, whereas the platen roller 24p at the erasing head 24 side is set as a subordinate of the transfer speed. For this purpose, weights on the rewritable recording medium 21 are so arranged that the weight on the printing head 23 side is greater than the weight on the erasing head 24 side by increasing the tension of the spring 23s which forces the printing head 23 downward. In this way, the transfer speed is adjusted, because the platen roller 24p slips, even if the transfer speed of the platen roller 24p exceeds that of the platen roller 23p.

In consideration of maintenance, the card reader unit 51a is constructed to open and close at its upper unit toward a direction of an arrow 200 as shown in FIG. 4 with a shaft 22a as the central axis. However, if it is so easily openable, there can be a possibility that information in the recording layer of the rewritable recording medium 21 may be damaged if the card reader unit 51a is opened during processing of the rewritable recording medium 21. Hence the card reader unit 51a is equipped with the latch unit 58, which can be released using an object that is readily available.

Figure 9:
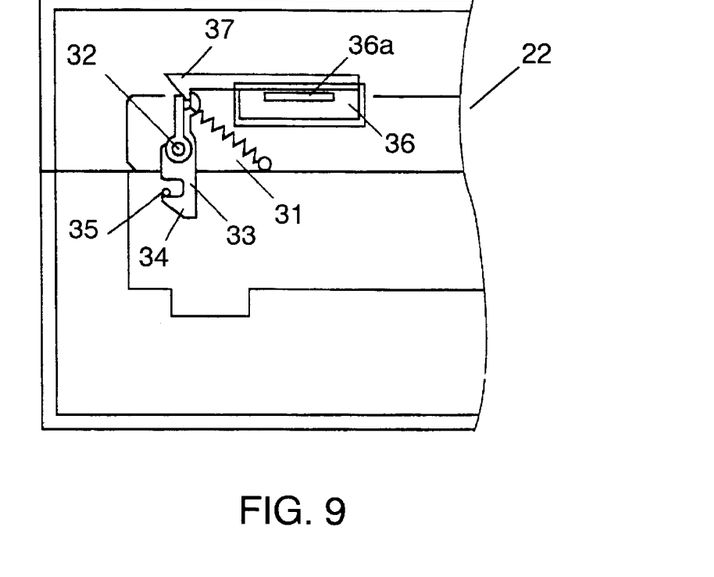
FIG. 9 is a structural drawing, in brief, showing movement of a latch mechanism of a card reader unit of a preferred embodiment of the invention.
Figure 10:
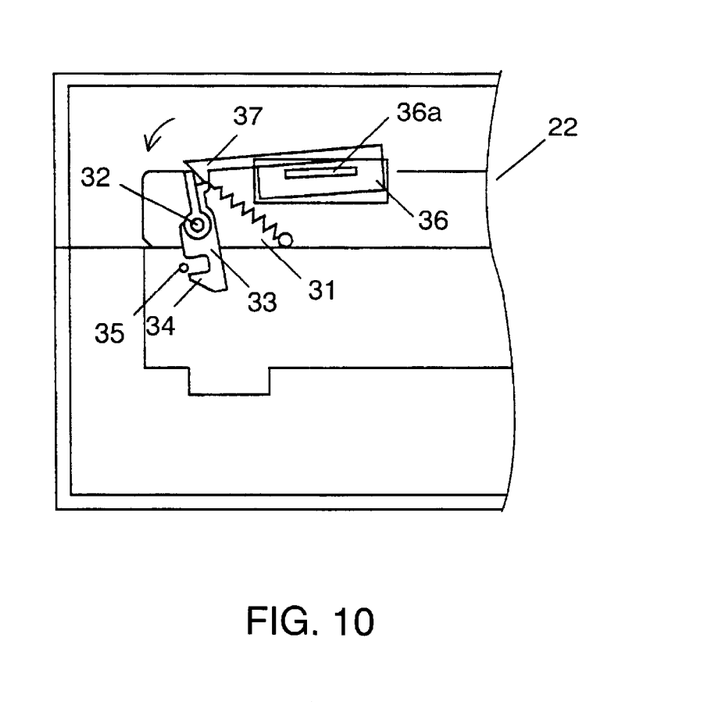
FIG. 10 is another structural drawing, in brief, showing a movement of the latch mechanism of the card reader unit of the same embodiment.
Figure 11:
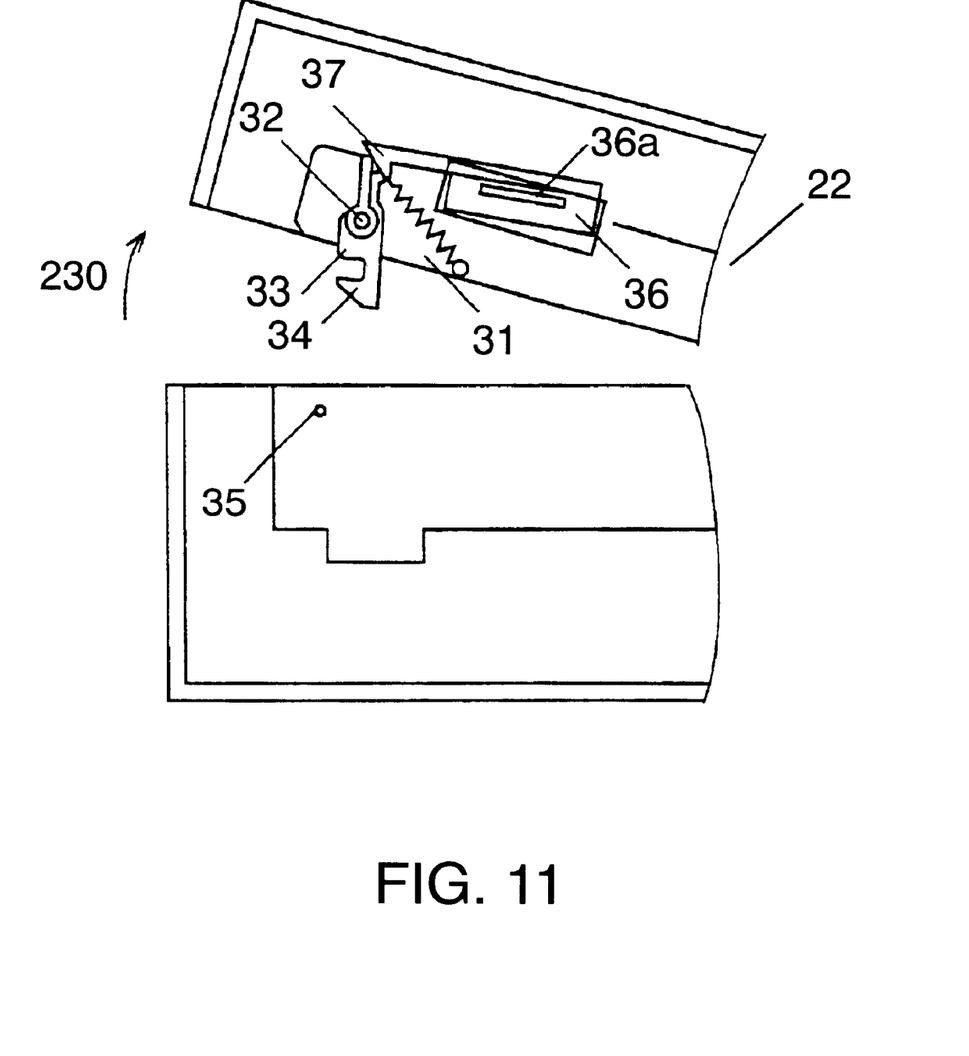
FIG. 11 is still another structural drawing, in brief, showing a movement of the latch mechanism of the card reader unit of the same embodiment.

Next, the latch mechanism is described by referring to FIG. 9 through FIG. 11.

The latch unit 58 on the card reader unit 51a is assembled in the upper unit of the card reader unit 51a, and it functions with a fixed pin 35 on the lower unit of the card reader unit 51a being hooked by a hook end 34 of a hook member 33, of which one end is pulled by a spring 31 with its center portion supported by a pivotal pin 32. One end of the hook member 33 is caught by a stopper 37 which extends from a lock button 36, and the hook end 34 can be unhooked from the fixed pin 35 by inserting an object such as a coin into a slit 36a on the lock button 36 and shifting it counterclockwise to turn the hook member 33 as shown in FIG. 10. This releases the latch as shown in FIG. 11, and the upper unit of the card reader unit 51a becomes openable in the direction of an arrow 230. An advantage of the latch mechanism is that it offers a safeguard, as it can not be released unless an object is inserted to turn the lock button 36. However, the latch is easily released only by a person with the intent to release the latch, since the lock button 36 can be turned by inserting a readily available object such as a coin.

Figure 12:
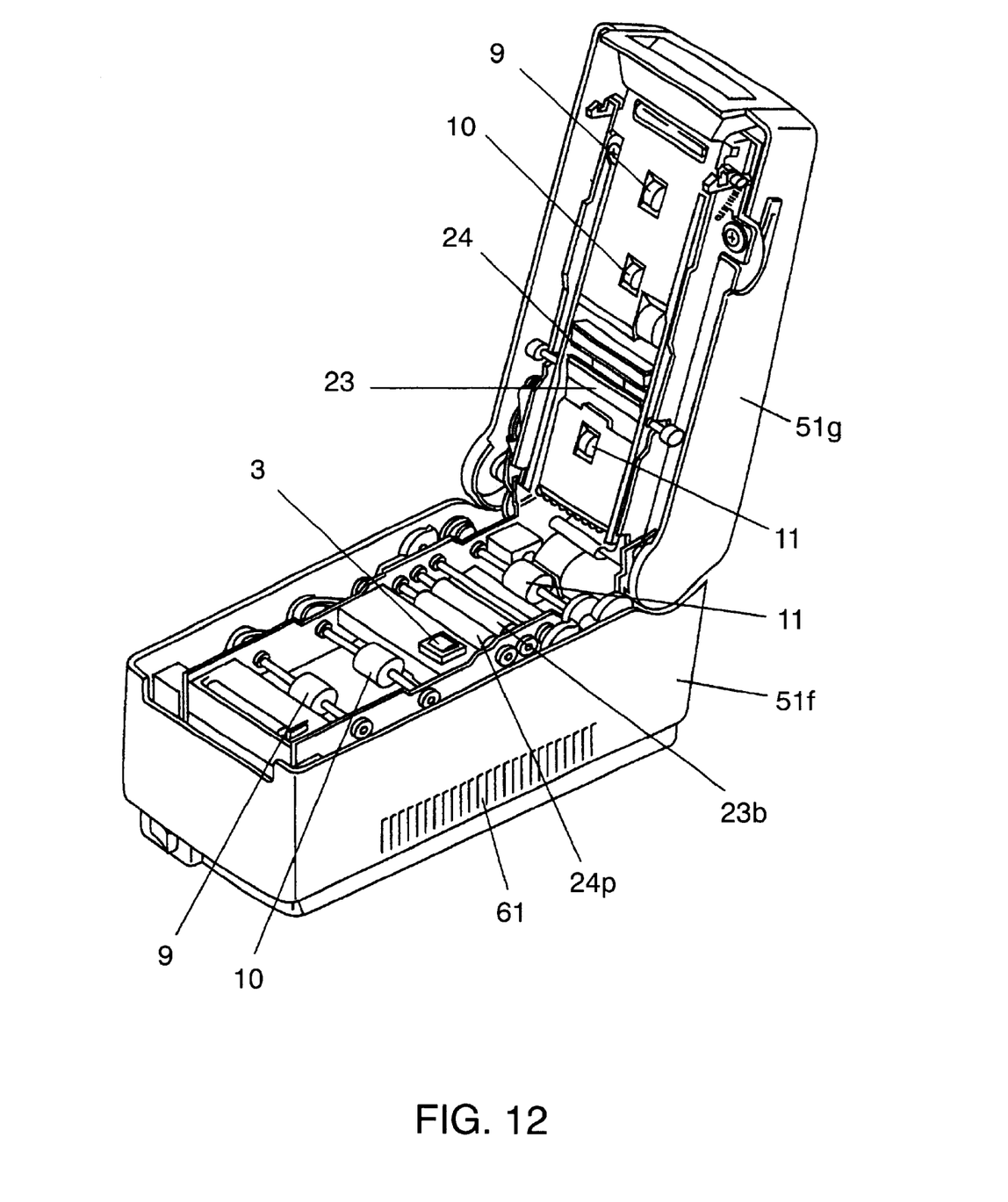
FIG. 12 is a perspective view showing a main body of the card reader, in its open position, of a preferred embodiment of the invention.

FIG. 12 is a perspective view showing a main body of the card reader, in its open position, of the preferred embodiment of the present invention. As shown, it improves the ease of maintenance since a jammed card, etc. is easily removable by opening the main body 51, which also exposes the card reader unit 51a.

Although the card reader unit 51a of an exemplary embodiment has been fully described as above, it is adaptable for use as a card reader responsive to a card employing only a magnetic stripe or a card reader responsive to a card employing an integrated circuit. As for an IC card, a card reader responsive to the so called contact IC card having electrodes on the card surface, and a non-contact IC card having an antenna embedded in the card are equally usable.

Figure 13:
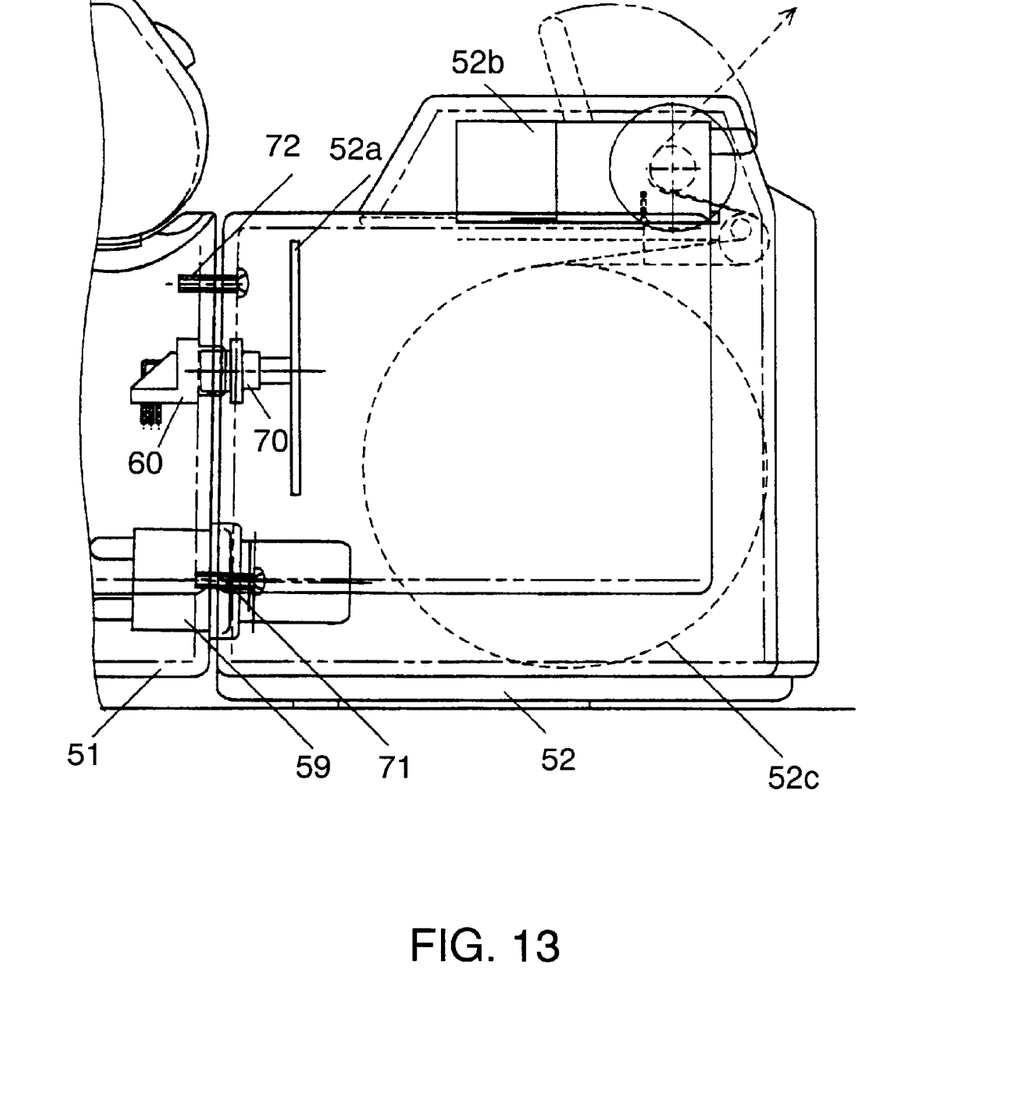
FIG. 13 is a fragmentary cross sectional side view showing an accessory device attached to a main body of the card reader of a preferred embodiment of the invention.

FIG. 13 shows a method of fixing the main body 51 of the card reader with the accessory device 52 in an embodiment of the present invention. A second connector 70 is disposed on the accessory device 52, and so constructed as it connects electrically to the first connector 60 of the main body 51. The second connector 70 also serves as a terminal for inputting and outputting signals of the second communication unit 52a. The main body 51 and the accessory device 52 are fixed with screws 71 and 72. Secure fixation can be provided not only by connecting the main body 51 and the accessory device 52 with the mating connectors, but also fixing them with the screws 71 and 72 in this manner. The main body 51 and the accessory device 52 would thus not separate even if a user inadvertently knocks the main body 51 or the accessory device 52, thereby offering a card reader with an improved reliability.

What is claimed is:

1. A card reader comprising:
   a main body;
   a card reader unit provided within said main body for executing at least one of recording and reproducing data on a rewritable recording medium inserted therein;
   a first communication unit provided within said main body for establishing at least one of input and output of a signal;
   an electric power supply unit provided within said main body for supplying electric power to each of said card reader unit and said first communication unit;
   a controller provided within said main body for controlling each of said card reader unit, said first communication unit, and said electric power supply unit;
   an accessory device removably attached to said main body, and having at least one function selected from a group consisting of a printing function, a data communicating function and a display function; and
   a second communication unit provided within said accessory device for executing at least one of receiving a signal from said first communication unit and sending a signal to said first communication unit;
   wherein said card reader unit is operable to transfer the rewritable recording medium inserted therein at a high speed to a predetermined position in said card reader unit, and is operable to reduce the transfer speed of the rewritable recording medium to a low speed when the rewritable recording medium arrives at the predetermined position.

2. The card reader according to claim 1, wherein said accessory device comprises a printing apparatus for printing data on a medium in response to the signal from said first communication unit.

3. The card reader according to claim 2, wherein said printing apparatus comprises a thermal head for printing characters on a thermal medium.

4. The card reader according to claim 1, wherein said first communication unit and said second communication unit comprise a connector.

5. The card reader according to claim 1, wherein said first communication unit and said second communication unit are adapted to supply electric power from said main body to said accessory device.

6. The card reader according to claim 1, wherein said main body further comprises an input unit for inputting data and a display unit for displaying data.

7. The card reader according to claim 1, wherein said first communication unit and said second communication unit comprise a plurality of connectors corresponding to said accessory device and at least one additional accessory device of a different kind.

8. The card reader according to claim 1, wherein said card reader unit comprises:
   a printing head for printing on the rewritable recording medium;
   an erasing head for erasing from the rewritable recording medium; and
   a driving mechanism for simultaneously moving said printing head and said erasing head so as to cause said printing head and said erasing head to simultaneously adjoin and disjoin with the rewritable recording medium.

9. The card reader according to claim 1, wherein said main body comprises a pair of main body units, said pair of main body units being connected by a hinge, and said card reader unit being separated into two parts, whereby said card reader unit opens when said pair of units are opened.

10. The card reader according to claim 1, wherein said main body has a first end and a second end opposite said first end, said card reader unit including a card insertion port at said first end of said main body, and said accessory device being removably attached by at least one of a fastener and a latching mechanism to said second end of said main body.

11. A card reader comprising:
    a main body;
    a card reader unit provided within said main body for executing at least one of recording and reproducing data on a rewritable recording medium inserted therein, wherein said card reader unit comprises:
      a printing head for printing on the rewritable recording medium;
      a platen roller at said printing head for transferring the rewritable recording medium;
      an erasing head for erasing from the rewritable recording medium; and
      a platen roller at said erasing head for transferring the rewritable recording medium;
      wherein a transfer speed of the rewritable recording medium at said printing head is greater than the transfer speed of the rewritable recording medium at said erasing head;
    a first communication unit provided within said main body for establishing at least one of input and output of a signal;
    an electric power supply unit provided within said main body for supplying electric power to each of said card reader unit and said first communication unit;
    a controller provided within said main body for controlling each of said card reader unit, said first communication unit, and said electric power supply unit;
    an accessory device removably attached to said main body, and having at least one function selected from a group consisting of a printing function, a data communicating function and a display function; and
    a second communication unit provided within said accessory device for executing at least one of receiving a signal from said first communication unit and sending a signal to said first communication unit.

12. The card reader according to claim 11, wherein said card reader unit further comprises:
    a driving mechanism for simultaneously moving said printing head and said erasing head so as to cause said printing head and said erasing head to simultaneously adjoin and disjoin with the rewritable recording medium.

13. A card reader comprising:
    a main body having a first end and a second end opposite said first end;
    a card reader unit provided within said main body for executing at least one of recording and reproducing data on a rewritable recording medium inserted therein, said card reader unit including a card insertion port at said first end of said main body;
    a first communication unit provided within said main body for establishing at least one of input and output of a signal;
    an electric power supply unit provided within said main body for supplying electric power to each of said card reader unit and said first communication unit;

a controller provided within said main body for controlling each of said card reader unit, said first communication unit, and said electric power supply unit;

an accessory device removably attached by at least one of a fastener and a latching mechanism to said second end of said main body, and having at least one function selected from a group consisting of a printing function, a data communicating function and a display function; and a second communication unit provided within said accessory device for executing at least one of receiving a signal from said first communication unit and sending a signal to said first communication unit;

wherein said card reader unit is operable to transfer the rewritable recording medium inserted therein at a high speed to a predetermined position in said card reader unit, and is operable to reduce the transfer speed of the rewritable recording medium to a low speed when the rewritable recording medium arrives at the predetermined position.

14. The card reader according to claim 13, wherein said accessory device comprises a printing apparatus for printing data on a medium in response to the signal from said first communication unit.

15. The card reader according to claim 14, wherein said printing apparatus comprises a thermal head for printing characters on a thermal medium.

16. The card reader according to claim 13, wherein said first communication unit and said second communication unit comprise a connector.

17. The card reader according to claim 13, wherein said first communication unit and said second communication unit are adapted to supply electric power from said main body to said accessory device.

18. The card reader according to claim 13, wherein said main body comprises a pair of main body units, said pair of main body units being connected by a hinge, and said card reader unit being separated into two parts, whereby said card reader unit opens when said pair of units are opened.

19. The card reader according to claim 13, wherein said main body further comprises an input unit for inputting data and a display unit for displaying data.

20. The card reader according to claim 13, wherein said first communication unit and said second communication unit comprise a plurality of connectors corresponding to said accessory device and at least one additional accessory device of a different kind.

21. The card reader according to claim 13, wherein said card reader unit comprises:

a printing head for printing on the rewritable recording medium;

an erasing head for erasing from the rewritable recording medium; and a driving mechanism for simultaneously moving said printing head and said erasing head so as to cause said printing head and said erasing head to simultaneously adjoin and disjoin with the rewritable recording medium.

22. A card reader comprising:

a main body having a first end and a second end opposite said first end;

a card reader unit provided within said main body for executing at least one of recording and reproducing data on a rewritable recording medium inserted therein, said card reader unit including a card insertion port at said first end of said main body, wherein said card reader unit comprises:

a printing head for printing on the rewritable recording medium; and a platen roller at said printing head for transferring the rewritable recording medium;

an erasing head for erasing from the rewritable recording medium; and a platen roller at said erasing head for transferring the rewritable recording medium;

wherein a transfer speed of the rewritable recording medium at said printing head is greater than the transfer speed of the rewritable recording medium at said erasing head;

a first communication unit provided within said main body for establishing at least one of input and output of a signal;

an electric power supply unit provided within said main body for supplying electric power to each of said card reader unit and said first communication unit;

a controller provided within said main body for controlling each of said card reader unit, said first communication unit, and said electric power supply unit;

an accessory device removably attached by at least one of a fastener and a latching mechanism to said second end of said main body, and having at least one function selected from a group consisting of a printing function, a data communicating function and a display function; and a second communication unit provided within said accessory device for executing at least one of receiving a signal from said first communication unit and sending a signal to said first communication unit.

23. The card reader according to claim 22, wherein said card reader unit further comprises:

a driving mechanism for simultaneously moving said printing head and said erasing head so as to cause said printing head and said erasing head to simultaneously adjoin and disjoin with the rewritable recording medium.

* * * * *